Nov. 6, 1934.                F. HELLMUTH                 1,979,467
            TEMPERATURE REGULATING DEVICE FOR BEDS OR BEDROOMS
                         Filed Jan. 28, 1932
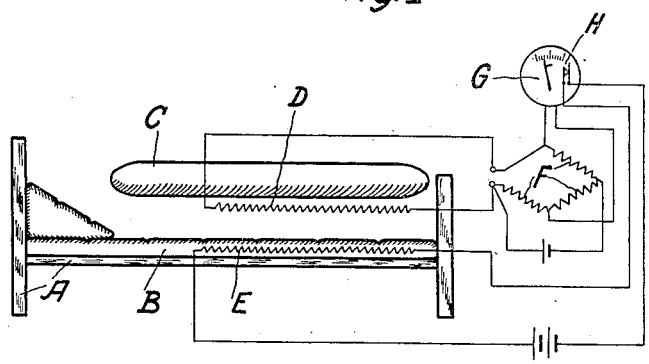
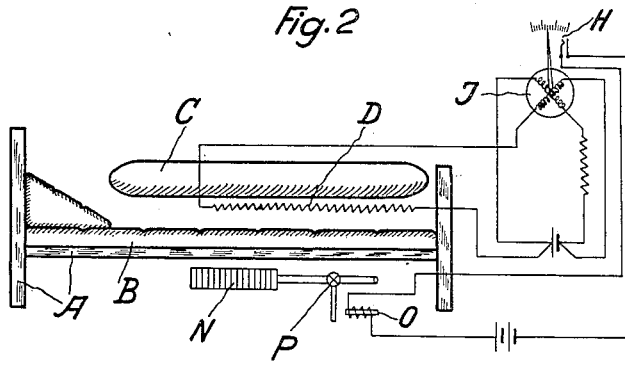
FRITZ HELLMUTH
    Inventor:
By: [signature]
    Attorney Patented Nov. 6, 1934

1,979,467

UNITED STATES PATENT OFFICE 1,979,467

TEMPERATURE REGULATING DEVICE FOR BEDS OR BEDROOMS

Fritz Hellmuth, Berlin-Karlshorst, Germany

Application January 28, 1932, Serial No. 589,465
In Germany June 27, 1929

2 Claims. (Cl. 219—20)

The present invention relates to a device for controlling the supply of heat or cold to beds, bedrooms and so forth, by means of which the temperature surrounding a sleeper in a bed or bedroom is controlled automatically in response to the skin temperature of the sleeper.

The device is particularly adapted in the case of healthy persons to control the bed temperature according to hygienic requirements, but is also capable of being used in the case of illness.

The invention is based on the knowledge that healthy hygienic sleep only occurs if a predetermined temperature of the bed is present in the direct vicinity of the body surface of the sleeper, which temperature, measured from the average temperature of the body surface, may at the most vary by about 2° C. from a normal temperature, which in the European climate amounts to about 36° C. The temperature of the skin is mostly lower than 36° C. and in the bed gradually rises to 36° C. If the passage of heat through the bedding is too great then a temperature of 36° C. is not reached in the bed, whereas if the passage of heat is too small the temperature in the bed exceeds 36° C. If the temperature of the skin rises above 37° C., the sleeper begins to perspire, whereby his sleep is affected. A normal, that is to say undisturbed hygienic sleep is, therefore, not possible at a skin temperature below 34° C. or at a skin temperature above 37° C.

The device in accordance with the present invention is so constructed that its control operation is made dependent upon a continuous measurement of the skin temperature, that is to say of the average temperature of the body surface, and is determined by this temperature.

The device consists of an adjustable heating or cooling device, known per se, and a remote temperature measuring device, also known per se, serving for the control thereof, of which the action takes place in accordance with the known standard of skin temperature by means of a large measuring surface, for example by means of a measuring cover, provided on the body of the sleeper or in his immediate vicinity. The measuring surface must be of such a size that it is capable of giving the average temperature of the entire body surface. It is for example provided in or on the covering or even under the sleeper, and is connected to a distant thermometer in such a manner that the heating value taken up thereby is not deceptive. The distant thermometer controls in the known manner by means of contacts or other means a heating device which for example consists of an electrically heatable appliance for placing in the bed of the type of the known heating cushions, or a cooling device or a device for the supply of heat or a cooling device. These heating and cooling devices may be of any known construction. They need not be provided on the bed itself, but may fulfill their purpose by controlling the temperature in the bedroom.

In the accompanying drawing are illustrated two forms of construction of the new device.

Fig. 1 shows an embodiment of my invention as applied to an electrically heated bedstead, and Figure 2 shows another application of the invention, where steam heat is employed.

In both figures A indicates the bedstead, B the mattress, C the coverlet, D a measuring cover which is placed underneath the coverlet and G the measuring instrument. The measuring cover D embodies a temperature responsive wire the resistance of which changes according to its temperature.

According to Figure 1 the measuring cover D forms one branch of a Wheatstone bridge, in the diagonal of which the measuring instrument G is located. The latter is provided with an adjustable contact H which in the case of the movement of the pointer corresponding with the predetermined temperature of the measuring cover, opens or closes the circuit of an electric heating device E located underneath the bedstead A.

According to Figure 2 the measuring cover D, instead of being connected to a Wheatstone bridge, is connected to a cross coil instrument J which is again provided with a contact H. The contact H in this case is also closed or opened when a determined temperature of the measuring cover is reached and then closes or opens the circuit of an electromagnet O which closes or opens a valve P of a steam pipe which supplies a heating body N provided underneath the bedstead A.

In a similar manner as heat is supplied artificially to the body of the sleeper it is also possible to remove heat, in that for example an air current is passed over the bed and carries away the heat from the surface thereof, or a covering is placed over the body of the sleeper which contains a multiple coil through which there flows a gaseous or fluid cooling medium, the passage of this medium per unit of time being controlled as above described by the temperature measuring device.

The new device may also be so constructed that when exceeding a predetermined temperature a cooling device is switched on and when passing below another predetermined temperature a heating device is switched on.

I claim:—

1. In an arrangement for holding a sleeper automatically at a hygienic sleeping temperature, a bedstead covering adapted closely to cover the body of the sleeper, a temperature-responsive device consisting of a wire the resistance of which changes according to its temperature and largely disposed throughout the area of said bedstead covering so as to be responsive to the average temperature of the body area of the sleeper, an electric circuit containing said resistance, an instrument for measuring the current in said circuit and indicating the average body temperature, temperature-varying elements located in the bedroom in heat transfer relationship to the bedstead, means for regulating said temperature-varying elements and controlled by the said measuring instrument to maintain the temperature in the vicinity of the sleeper's body within narrow limits above and below the normal temperature of the human body.

2. In an arrangement for holding a sleeper automatically at a hygienic sleeping temperature, a beadstead covering adapted closely to cover the body of the sleeper, a temperature-responsive device consisting of a wire the resistance of which changes according to its temperature and largely disposed throughout the area of said bedstead covering, so as to be responsive to the average temperature of the body area of the sleeper, an electric circuit containing said resistance, an instrument for measuring the current in said circuit and indicating the average body temperature, an electric heater located beneath the bedstead, a supply circuit for said heater, and means operated by said measuring instrument for controlling said supply circuit to maintain the temperature in the vicinity of the sleeper's body within narrow limits above and below the normal temperature of the human body.

FRITZ HELLMUTH.